United States Patent
Löbig

(10) Patent No.: US 7,606,216 B2
(45) Date of Patent: Oct. 20, 2009

(54) DEVICE FOR THE PACKET-BASED ACCESS OF CLASSICAL ISDN/PSTN SUBSCRIBERS TO A SWITCHING SYSTEM

(75) Inventor: Nobert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1074 days.

(21) Appl. No.: 10/450,946

(22) PCT Filed: Nov. 12, 2001

(86) PCT No.: PCT/DE01/04239

§ 371 (c)(1),
(2), (4) Date: Jun. 18, 2003

(87) PCT Pub. No.: WO02/51196

PCT Pub. Date: Jun. 27, 2002

(65) Prior Publication Data

US 2004/0037273 A1 Feb. 26, 2004

(30) Foreign Application Priority Data

Dec. 18, 2000 (DE) .............................. 100 63 082

(51) Int. Cl.
*H04J 3/12* (2006.01)
(52) U.S. Cl. ..................................... 370/352; 370/354
(58) Field of Classification Search .................. 370/352, 370/354

See application file for complete search history.

(56) References Cited

U.S. PATENT DOCUMENTS 4,975,896 A * 12/1990 D'Agosto et al. ........ 369/29.01

(Continued)

FOREIGN PATENT DOCUMENTS

EP 0-966145 A2 12/1999

OTHER PUBLICATIONS

Ramnath A. Lakshmi-Rafan; The Lucent Technologies Softswitch—Realizing the Promise of Convergence; XP-000851517, Bell Labs Technical Journal, Wiley CA, US , Apr.-Jun. 1999; vol. 4, No. 2, Apr. 1999—Jun. 1999, p. 174-195.

(Continued)

*Primary Examiner*—Creighton Smith
(74) *Attorney, Agent, or Firm*—Laurence A. Greenberg; Werner H. Stemer; Ralph E. Locher

(57) ABSTRACT

The invention relates to a device for the packet-based access of classical ISDN/PSTN subscribers to a switching system. The convergence of packet-based networks and TDM networks leads to a situation where classical analogous and ISDN subscribers and private branch exchanges have to be accessed via packet-based transmission methods. This problem is solved by the present invention by integrating the devices of a subscriber network that according to the state of the art are located outside the switching systems and that provide the main functions such as addressing, message routing for signaling messages and TDM interface for local branch exchange into the periphery of the switching system. The functionality of the interlace that focuses on the subscriber-side is thus also integrated into the periphery of the switching system. At the same time, the approach to the subscriber network and the mode of using it remain the same for the internal devices (kernel) of the switching system.

21 Claims, 3 Drawing Sheets

U.S. PATENT DOCUMENTS

| | | | | |
|---|---|---|---|---|
| 5,751,574 | A | * | 5/1998 | Loebig ........................ 700/82 |
| 6,400,708 | B1 | * | 6/2002 | Bartholomew et al. ...... 370/352 |
| 6,480,487 | B1 | * | 11/2002 | Wegleitner et al. .......... 370/354 |
| 7,372,869 | B2 | * | 5/2008 | Lobig ........................ 370/463 |
| 2003/0202464 | A1 | * | 10/2003 | Matsumoto et al. ......... 370/222 |

OTHER PUBLICATIONS

Huitema C. et al.; An Architecture for Residential Internet Telephony Service; IEEE Network, IEEE Inc., New York, US, vol. 13, No. 3, May 1999, pp. 50-56; XP000870631.

Araci D; Voice over DSL: Arazi D: "Voice Over DSL" Funkschau, Bd. 72, Nr. 24, Nov. 12, 1999, Seiten 64-66.

* cited by examiner

DEVICE FOR THE PACKET-BASED ACCESS OF CLASSICAL ISDN/PSTN SUBSCRIBERS TO A SWITCHING SYSTEM

CLAIM FOR PRIORITY

This application claims priority to International Application No. PCT/DE01/04239 which was published in the German language on Jun. 27, 2002.

TECHNICAL FIELD OF THE INVENTION

The invention relates to a device and method for connecting traditional analog and ISDN subscribers to a switching system.

BACKGROUND OF THE INVENTION

To access traditional analog and ISDN subscribers and private branch exchanges, remote switching units (RSU) or access networks (AN) are used. Both represent devices which are external to the exchange and which are linked to the peripheral devices of the exchange via consolidating-type interfaces.

The remote switching units/access networks have mechanisms, formed in accordance with their respective definition, for delivering the subscriber signaling to the peripheral devices of the switching system. At the same time, signaling capabilities are provided for controlling the remote switching unit/access network themselves. For example, these relate to switching through voice channels of the subscriber line or of the branch exchange to voice channels of the interface of the remote switching unit/access network to the peripheral devices of the switching node. The operating state of subscriber line and branch exchange is also adjusted on this path between remote switching unit/access network and the switching system.

As a rule, the subscriber signaling and control information is exchanged in a message-based fashion in the manner predetermined by the interface definition. Typically, the entire interface is PCM-based and certain time slots are reserved for the message-based transmission of subscriber/branch exchange signaling and control information.

An example of a consolidating-type interface between an access network and a local exchange is the V5.2 interface. This provides for ISDN signaling, ISDN packet data to be transmitted on the D channel and message-based analog signaling (PSTN) in time slots of the interface which can be defined according to specifications of the standard. To control the access network, signaling protocols are provided which relate to the switching-through of information through the access network, the adjustment of port and PCM link states and the switching of failed signaling channels to standby.

Although proprietary message-based consolidating-type interfaces can differ significantly from the specifications of the V5.2 standard in terms of the definition, all message-based interfaces to remote switching units/access networks have the common feature that they transmit subscriber signaling information (ISDN signaling messages, ISDN packet data, PSTN messages) and control information for switching-through or for port state adjustment in certain time slots of a TDM-based interface.

The convergence of packet-based networks and TDM networks leads to the problem of how to provide service to traditional analog and ISDN subscribers and private branch exchanges via packet-based transmission methods.

The Internet can be accessed in a highly efficient manner via xDSL links to the subscriber line or via cable networks. This provides sufficient bandwidth in the local loop to be able to handle narrow-band traditional telephony/fax traffic additively via the same access line.

From the point of view of the subscriber, additive connectivity of conventional subscriber terminals and private branch exchanges should thus be possible. In addition, all subscriber features known from the traditional PSTN/ISDN networks should remain available. However, the user data necessary for the switching traffic are transmitted in a packet-based manner in contrast to the situation of a remote switching unit/access network. The same is true of the signaling.

In this situation, the problem arises how to connect traditional subscribers or branch exchanges (i.e. POTS, ISDN BA, ISDN PRI), which are served via subscriber termination devices (e.g. IAD of an xDSL link, set-top box of a cable network) with access to a packet network, in such a manner that all traditional subscriber features (including D-channel packet data) are available, in principle. Furthermore, it should be possible to reuse the HW and SW functions of a traditional exchange, user data streams should be preferably conducted in a packet-based manner or optionally it should be possible to bring them into the exchange by TDM technology and to transmit signaling information and ISDN packet data to the exchange in a packet-based manner.

In the prior art, these traditional subscribers are carried as a part of an access network to solve this problem. This network exhibits centralized components (e.g. IAT) which convert the narrow-band user data stream into TDM technology and provide signaling and user data streams in the form of a V5.2 interface. The user data streams are then processed in a conventional local exchange of the PSTN/ISDN network. Broadband traffic is supplied and forwarded by means of suitable upstream multiplexing devices. The corresponding situations are shown diagrammatically in FIG. 1.

Accordingly, an access network AN is illustrated which supplies information from a plurality of subscriber terminals to the peripheral devices of a local exchange LE. The subscriber termination device provided is a device IAD which supports specific functions of xDSL transmission methods. In a multiplexer DSLAM, narrow-band information is separated from broadband information and the xDSL link is terminated. The voice and signaling information is supplied in an IP-based manner via an ATM network as carrier to a device IAT which forms the head end of the access network AN. The latter supplies the voice and signaling information to a local exchange LE via a V5.2 interface.

The advantages of the concept illustrated there are, on the one hand, the utilization of an existing consolidating-type interface and, on the other hand, the availability of all subscriber features supported by the exchange. The decisive disadvantage, on the other hand, lies in the utilization of TDM technology in an exchange active in the environment of convergent networks. To this is added a deterioration in the voice quality due to the possibly avoidable conversion of the user data stream between TDM technology with codec G.711 and the packet-based transmission by means of a generally compressing-type codec such as e.g. G.723.1.

SUMMARY OF THE INVENTION

The invention discloses an approach as to how traditional subscribers can be linked with simple means to an exchange via packet-based transmission methods.

One advantage to the invention is that the devices of an access network which are arranged externally to the exchanges in the prior art and which provide centralized functions such as address translation, message routing for signaling messages and TDM interface to the local exchange LE are integrated into the periphery of the exchange. Thus, the functions of the consolidating-type interface on the access network side are integrated into the periphery of the switching system. At the same time, the way in which an access network is approached and how it is operated remains the same for the internal devices (kernel) of the exchange. The consolidating-type subscriber interface of a local exchange, which is defined for message-based signaling, can thus continue to be used with regard to SW and HW functions for the call processing of traditional subscribers at the subscriber termination device.

The call processing of the subscriber signaling, the forwarding of the D-channel packet data by means of the existing means of the consolidating-type subscriber interface can be considered to be a further advantage. For this purpose, addressing, message formats and protocols must be adapted in the peripheral adaptation device preceding the peripheral device according to the invention. This is done by combining the signaling of a plurality of subscribers at the subscriber termination device to form a subscriber entity and allocating it to a logical signaling channel or a signaling path in accordance with the definition of the consolidating-type interface.

Furthermore, in particular, the subscriber signaling is brought to the peripheral device in accordance with the case of the connection of a TDM-based consolidating-type interface. Furthermore, prior failures, i.e. failures of the peripheral adaptation device, are mapped to signaling channel failures of the interface with switching to standby which may be possible. If it is required, subscriber-oriented configuration data and topology information only needs to be stored in the peripheral adaptation device via a dedicated management interface.

BRIEF DESCRIPTION OF THE DRAWINGS

In the text which follows, the invention is explained in greater detail with reference to an exemplary embodiment shown in figures, in which.

DETAILED DESCRIPTION OF THE INVENTION

Figure 1:
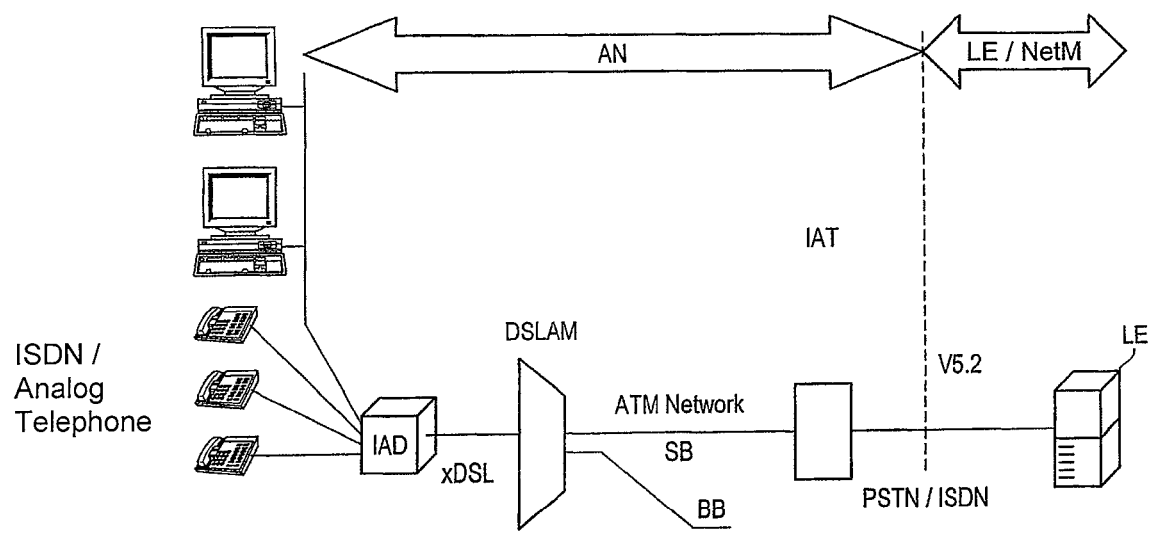
FIG. 1 shows the conditions in the access network according to the prior art.
Figure 2:
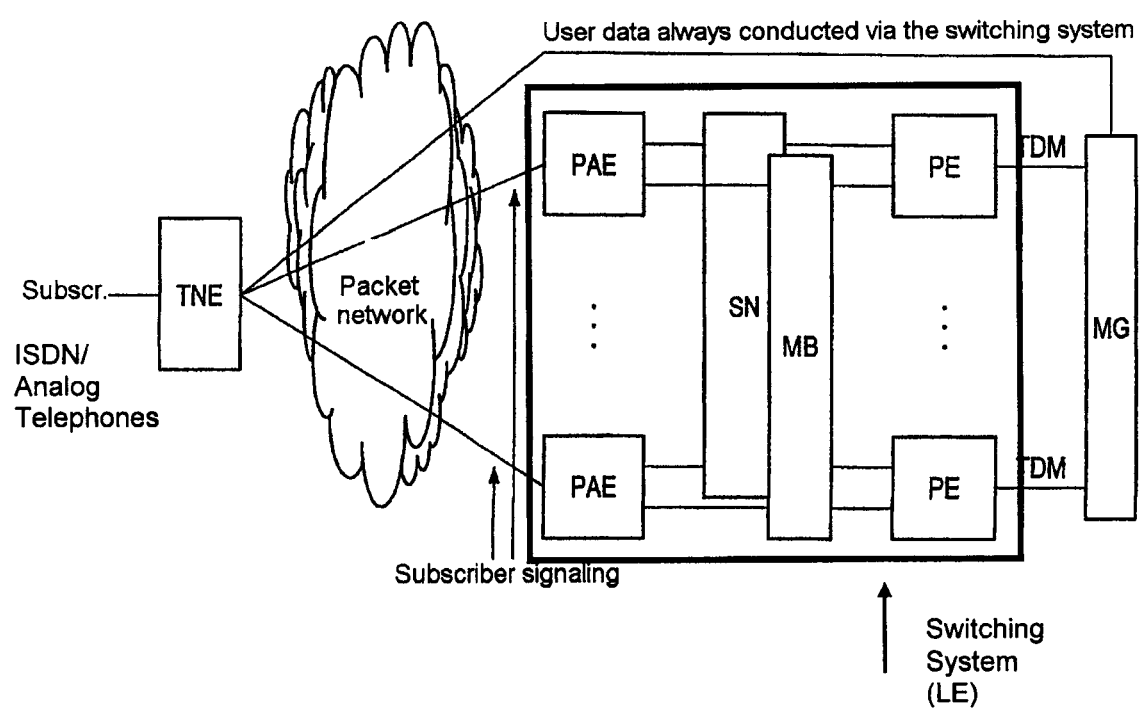
FIG. 2 shows a consolidating-type interface with mandatory user data conversion.

FIG. 2 shows a subscriber termination device TNE with the traditional subscriber interfaces (a/b wire, S0, S2M). This terminates the physical subscriber lines of POTS, ISDN BA and ISDN PRI. The subscriber termination device TNE is essentially identical to that of the prior art according to FIG. 1. It has access to at least two peripheral adaptation devices PAE of the exchange and this access is packet-based.

The peripheral adaptation devices PAE also shown here are a peripheral component of the exchange. They have access to the message distribution system MB of the exchange. In addition, they may have access to the switching network SN and, as an alternative, PCM-based interfaces can be provided at the peripheral adaptation device PAE.

Finally, peripheral devices PE of the exchange are provided with access to the message distribution system MB and switching network SN. A plurality of the peripheral devices PE allocated to a consolidating-type interface provides the call processing function for this consolidating-type interface.

For this purpose, a peripheral device PE terminates a plurality of PCM links of this consolidating-type interface in conventional application. If ISDN packet data are supported on the D channel, the said plurality of the peripheral devices allocated to the consolidating-type interface also provides the transfer function for D-channel packet data to the packet handler interface.

When a subscriber termination device TNE is switched on, it attempts to establish communication with one of the peripheral adaptation devices PAE allocated to it. The packet addresses of the associated peripheral adaptation devices PAE can be stored locally in the subscriber termination device TNE. Optionally, they can be interrogated with the start-up at the management system responsible for the network. If communication with the relevant peripheral adaptation device PAE fails, a new attempt at communication with another associated peripheral adaptation device PAE takes place. In the case of a failure, the communication attempt is cyclically repeated with one of the peripheral adaptation devices PAE.

If communication to a peripheral adaptation device PAE has been established, the subscriber signaling is transparent for ISDN subscribers and branch exchanges. This means that the messages arriving via the D channel are sent in a packet-based manner in the direction of the peripheral adaptation device PAE. Messages sent to the peripheral adaptation device PAE contain the packet address of the subscriber termination device TNE supplemented by the identification of the relevant port or, respectively, a packet address which clearly shows the sending D channel. Messages sent from the peripheral adaptation device PAE to the subscriber termination device TNE contain the packet address of the customer premises equipment TNE supplemented by the identification of the port affected or, respectively, a packet address which clearly shows the receiving D channel.

Signaling messages and packet data on the D channel are transmitted in the same manner. The ISDN L2 can be transmitted unsecured, which is completely adequate especially in good packet networks. To improve the quality of transmission (order of messages, delays), the ISDN L2 is preferably terminated in the subscriber termination device TNE and a secure protocol is used between this and the peripheral adaptation device PAE.

For subscriber lines with analog signaling, the line signals are converted to switching messages in the subscriber termination device TNE or, respectively, switching messages are converted into line signals in the opposite direction. These are exchanged in the same manner between the subscriber termination device TNE and the peripheral adaptation device PAE as is the case for signaling messages of the ISDN subscribers at the subscriber termination device TNE. If necessary, a protocol deviating from the ISDN case can be used. The analog port is addressed via a packet address for each analog port or via a packet address, supplemented by a port identification, for a plurality of analog ports at the customer premises equipment TNE.

The through-connection orders of a channel for a port at the subscriber termination device TNE and possibly the state of availability of the port are exchanged between subscriber termination device TNE and peripheral adaptation device PAE. For this purpose, a packet-based protocol is used which covers the functions.

If the consolidating-type interface of the exchange is constructed in such a manner that a port has simultaneous access to the switching system via a number of communication channels (which is the case, for example, in load-sharing mode), communication relations between subscriber termination device TNE and a number of peripheral adaptation devices PAE are set up and simultaneously used in the above sense.

To simplify the description, the case of allocating a port to in each case a maximum of one communication channel for ISDN signaling, ISDN D-channel packet data and/or PSTN signaling will be considered in the text which follows, each of which are conducted via the same peripheral adaptation device PAE. If a communication session running via a peripheral adaptation device PAE is aborted, the subscriber termination device TNE cyclically attempts to set up a new communication session with another peripheral adaptation device PAE. To do this, it stops the packet-based user data streams allocated to the active ports.

The functions of the peripheral adaptation device PAE are used for adapting the messages, used on the interface between subscriber termination device TNE and peripheral adaptation device PAE, to the needs of the consolidating-type interface allocated to the TNE port.

Thus, in particular, there is address translation between the addressing used for the TNE port and the exchange-internal address of the port on the consolidating-type interface responsible for the port. Furthermore, the protocol of the subscriber signaling of the messages used in the direction of the subscriber termination device TNE is converted to the protocol used with the respective signaling channels of the consolidating-type interface.

This provides for forwarding the ISDN signaling data between peripheral adaptation devices PAE and the peripheral equipment PE. This is done in a TDM-based manner via the switching network to the peripheral equipment PE which terminates the respective signaling channels. For this purpose, system-internal nailed-up connections established during a system start-up are used. The signaling messages of the subscriber termination device TNE are distributed to a plurality of such nailed-up connections by means of the associated consolidating-type interface, the port address and the type of message. If the message distribution system supports a sufficiently high-performance message transfer between the peripheral equipment PE and the peripheral adaptation device PAE, the message transmission via NUC and switching network can also be omitted and, as an alternative, the message distribution system can be used for transmitting the signaling messages between peripheral equipment and peripheral adaptation device.

The peripheral adaptation device PAE thus creates the precondition for the signaling of the subscribers to the subscriber termination device TNE to arrive in the peripheral equipment PE belonging to the consolidating-type interface of the switching system in the same manner as if it had been delivered by TDM technology via an intermediate access network AN. Signaling data are processed in the manner normally used in the consolidating-type interface. D-channel packet data are forwarded to the packet handler interface.

The signaling, necessary for controlling the consolidating-type interface, to effect through-connection operations and to adjust the port state also occurs via a peripheral adaptation device PAE, these also being conducted via NUC or via the message distribution system.

The method mentioned above provides for two types of consolidating-type interface.

As shown in FIG. 2, the first is characterized by the fact that it brings the user data channels of the ports at the subscriber termination device TNE via a media gateway MG into peripheral equipment PE allocated to the call with respect to call processing. This type of connection provides, in particular, all subscriber features for the port (consolidating-type interface with mandatory user data conversion).

Figure 3:
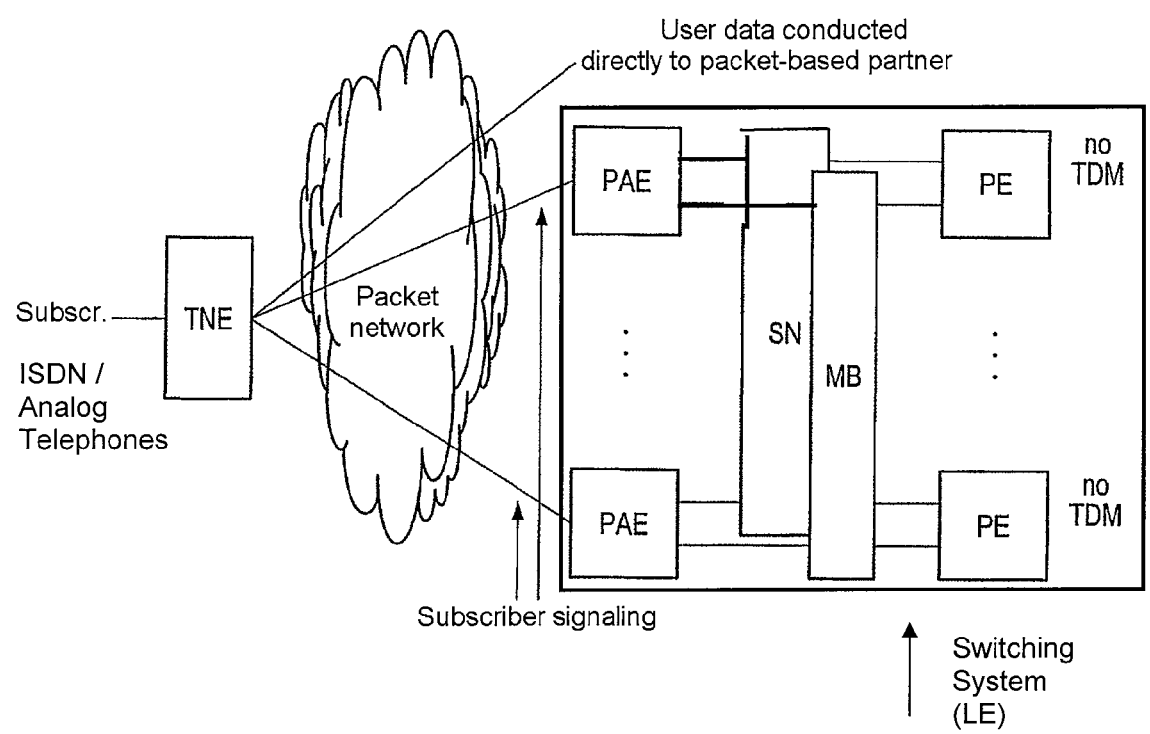
FIG. 3 shows a consolidating-type interface without mandatory user data conversion.

As shown in FIG. 3, the second type of consolidating-type interface dispenses with the mandatory conversion of the user channel to TDM format and thus provides for the direct exchange of the user data between two subscribers at the subscriber termination device TNE, bypassing the exchange. This may be associated with restrictions with regard to the availability of the subscriber features (consolidating-type interface without mandatory user data conversion).

If the peripheral adaptation devices PE output switching-through commands in the direction of the remote switching unit/access network during connection set-up, these are converted to adjustment commands to the customer premises equipment TNE and the intermediate media gateway MG in the peripheral adaptation device PAE.

If more complex subscriber termination devices (TNE variants) are used which have to be combined in shelves or cabinets and may use jointly used high-level subscriber-oriented functional units and transmission devices, the functions of an access network, required for this purpose, can also be provided by the peripheral adaptation device PAE. The data structures necessary for these alerting and maintenance functions are maintained in the peripheral adaptation device PAE. The necessary interface to the management system is maintained separately from that of the switching system to advantageously reduce the complexity of the overall system which then provides both functions of a local exchange and those of a local line distribution network without the latter being provided as a separate facility.

What is claimed is:

1. A device for connecting analog and ISDN subscribers to a switching system, comprising:
    a subscriber termination device in which subscriber signaling is transmitted in a packet-based manner via a network between the subscriber termination device and the switching system,
    a common set of peripheral devices of the switching system allocated to a plurality of subscribers,
    the peripheral devices allocated to one of the plurality of subscribers at a subscriber termination device provides at least one of switching resources and functions for a line; and
    at least one peripheral adaptation device arranged in a periphery of the switching system and used for adapting messages, which are used on an interface between the subscriber termination device and the peripheral adaptation device, according to requirements of the common set of peripheral devices allocated to a port of the subscriber termination device.

2. The device as claimed in claim 1, wherein the subscriber termination device and the at least one peripheral adaptation device exhibit an interface to a packet network and the at least one peripheral adaptation device supports bi-directional message transfer between the subscriber termination device and at least one associated peripheral device.

3. The device as claimed in claim 2, wherein, in the message transfer between the subscriber termination device and the at least one peripheral adaptation device, an address translation takes place between addressing used for the subscriber termination device port in the packet-based network and an exchange-internal address of the port in the set of peripheral devices allocated to the port.

4. The device as claimed in claim 1, wherein, in the at least one peripheral adaptation device, a protocol of the subscriber signaling is converted between the messages used by the subscriber termination device and the messages used in the set of associated peripheral devices.

5. The device as claimed in claim 1 wherein, in a message transfer between the at least one peripheral adaptation device and an associated peripheral device takes place via a message distribution system of an exchange.

6. The device as claimed in claim 1, wherein a message transfer between the at least one peripheral adaptation device and an associated peripheral device takes place via nailed-up connections, the messages of the subscriber termination device being distributed to a plurality of the nailed-up connections by the address of the subscriber termination device in the packet network and the message.

7. The device as claimed in claim 1, wherein for subscriber lines with analog signaling, line signals are converted to switching messages in the subscriber termination device or switching messages are converted into the line signals in an opposite direction.

8. The device as claimed in claim 1, wherein if communication has been established between the peripheral adaptation device and the subscriber termination device, the subscriber signaling is transparent for the ISDN subscribers and branch exchanges.

9. The device as claimed in claim 1, wherein messages exchanged between the peripheral adaptation device and the subscriber termination device include a packet address of the subscriber termination device supplemented by identification of a relevant port or a packet address which shows a transmitting or receiving D channel or a transmitting or receiving analog port.

10. The device as claimed in claim 1, wherein the subscriber signaling is transmitted between the subscriber termination device and the at least one peripheral adaptation device via one of the following protocols:
   IP/UDP for analog and ISDN subscribers,
   SCTP/IUA for ISDN subscribers,
   SCTP/V5UA for analog and ISDN subscribers, or
   MGCP or H.248 for analog subscribers.

11. The device as claimed in claim 1, wherein address translations in the peripheral adaptation device take place via tables, table entries being made based on administrative events which are reported to the peripheral adaptation device via an interface to network management which is separate from the switching system.

12. The device as claimed in claim 1, wherein an SNMP protocol is used for a separate interface to the network management.

13. The device as claimed in claim 1, wherein a pair of peripheral adaptation devices is allocated to a plurality of pairs of peripheral devices, each one of which operates a plurality of the subscriber termination devices with respect to call processing for operating lines.

14. The device as claimed in claim 1, wherein a user data stream is switched through between a line at the subscriber termination device and a remote communication partner at a request of one of the peripheral devices allocated to the line and under control of the peripheral adaptation device.

15. The device as claimed in claim 14, wherein the user data stream of a connection of the line at the subscriber termination device is brought via a media gateway in a TDM-based manner into one of the peripheral devices, the switching-through of the user channel of the line at the subscriber termination device to a channel of the media gateway preceding the peripheral devices taking place under stimulation of the peripheral device active for connection and leading to activation of a preceding media gateway and the subscriber termination device by the peripheral adaptation device during allocation and deallocation of the switching-through of the user data stream.

16. The device as claimed in claim 15, wherein MGCP protocol or H.248 is used for switching through the user data stream in the preceding media gateway and in the subscriber termination device.

17. The device as claimed in claim 14, wherein the user data stream of a connection of a line at the subscriber termination device is not automatically brought into one of the peripheral devices in a TDM-based manner via a media gateway, and a direct packet-based user data stream with a remote partner is supported, the switching-through of the user channel of the line at the subscriber termination device to a channel of the remote partner taking place in a packet-based manner with an exchange of packet addresses of the two partners and following a stimulation of the peripheral device active for the connection, and leads to activation of the subscriber termination device by the peripheral adaptation device during switching-through of the user data stream and to the releasing of the user data stream.

18. The device as claimed in claim 17, wherein MGCP protocol or H.248 is used for switching through the user data stream in the subscriber termination device.

19. The device as claimed in claim 17, wherein the remote partner is a subscriber at a subscriber termination device, a subscriber which can be reached via a media gateway or an IP-based subscriber of the network.

20. The device as claimed in claim 14, wherein the peripheral devices provide switching functions of a V5.2 interface by providing V5.2-defined messages of PSTN, of ISDN, of port control and of bearer channel connection protocol, such that the signaling is conducted via a peripheral adaptation device which performs a protocol and address conversion to requirements of activation of the subscriber termination devices.

21. The device as claimed in claim 20, wherein the subscribers at the subscriber termination device are set up as V5.2 subscribers in the switching system, the V5.2-specific parameters of the allocation of a V5.2 address and of the logical V5.2 communication channels not being required as operator input.

\* \* \* \* \*